United States Patent [19]

Felix

[11] Patent Number: 4,870,711
[45] Date of Patent: Oct. 3, 1989

[54] METAL FOUNDATION FOR BEDS

[76] Inventor: Arthur O. Felix, 10316 Wiley Burke, Downey, Calif. 90241

[21] Appl. No.: 271,031

[22] Filed: Nov. 14, 1988

[51] Int. Cl.$^4$ .............................................. A47C 19/00
[52] U.S. Cl. ...................... 5/200 R; 5/201; 5/282 R; 5/286; 403/205; 403/403; 403/363
[58] Field of Search ............... 5/201, 200 R, 200 B, 5/200 C, 285, 286, 282 R, 400; 403/205, 403, 363

[56] References Cited

U.S. PATENT DOCUMENTS

| | | | |
|---|---|---|---|
| 583,164 | 5/1897 | Bailey | 5/286 |
| 671,297 | 4/1901 | Russell | 5/285 |
| 1,076,964 | 10/1913 | Dunner | 5/279 |
| 1,631,076 | 5/1927 | Trimble | 5/200 C |
| 2,485,493 | 10/1949 | Jacobs | 5/285 |
| 2,553,745 | 1/1971 | Sproll | 5/236 |
| 2,712,137 | 7/1955 | Hunter | 5/201 |
| 3,605,141 | 9/1971 | Silverman | 5/200 R |
| 3,950,797 | 4/1976 | Bronstien, Jr. | 5/200 R |
| 4,016,612 | 4/1977 | Barile, Sr. | 5/200 C |
| 4,112,529 | 9/1978 | Golembeck et al. | 5/191 |
| 4,646,371 | 3/1987 | Nowell | 5/201 |
| 4,694,519 | 9/1987 | Benoit | 5/20 DC |
| 4,698,863 | 10/1987 | Mis | 5/200 C |
| 4,729,136 | 3/1988 | Santo | 5/201 |

FOREIGN PATENT DOCUMENTS

| | | | |
|---|---|---|---|
| 2709449 | 4/1977 | Fed. Rep. of Germany | 5/282 R |
| 1135152 | 4/1957 | France | 5/282 R |

*Primary Examiner*—Alexander Grosz
*Attorney, Agent, or Firm*—Christie, Parker & Hale

[57] ABSTRACT

A metal foundation for a bed comprises a modular system of components easily assembled without conventional fasteners. The assembly includes parallel tubular side frame members of rectangular cross-section, each having two L-shaped pieces interlocked lengthwise in a sliding fit. Vertical stiffening ribs spaced apart along the inside and outside faces of the rectangular side members add rigidity. A pair of parallel tubular rectangular end frame members similar to the side members are at opposite ends of the foundation. Four L-shaped and tubular corner connectors of rectangular cross-section provide sockets to slidably receive the ends of the side and end frame members at the corners of the foundation. Longitudinal and lateral inverted U-shaped cross-slats slidably fit into corresponding slots in the inside faces of the side and end frame members. Tapered vertical legs with casters slidably extend into flange openings at the corners of the corner connectors for holding the assembled foundation in a fixed position spaced above the floor. The tops and sides of the assembled foundation are covered with cloth, and hooks at lower inside surfaces of the side and end frame members capture the edges of the cloth covering.

6 Claims, 3 Drawing Sheets

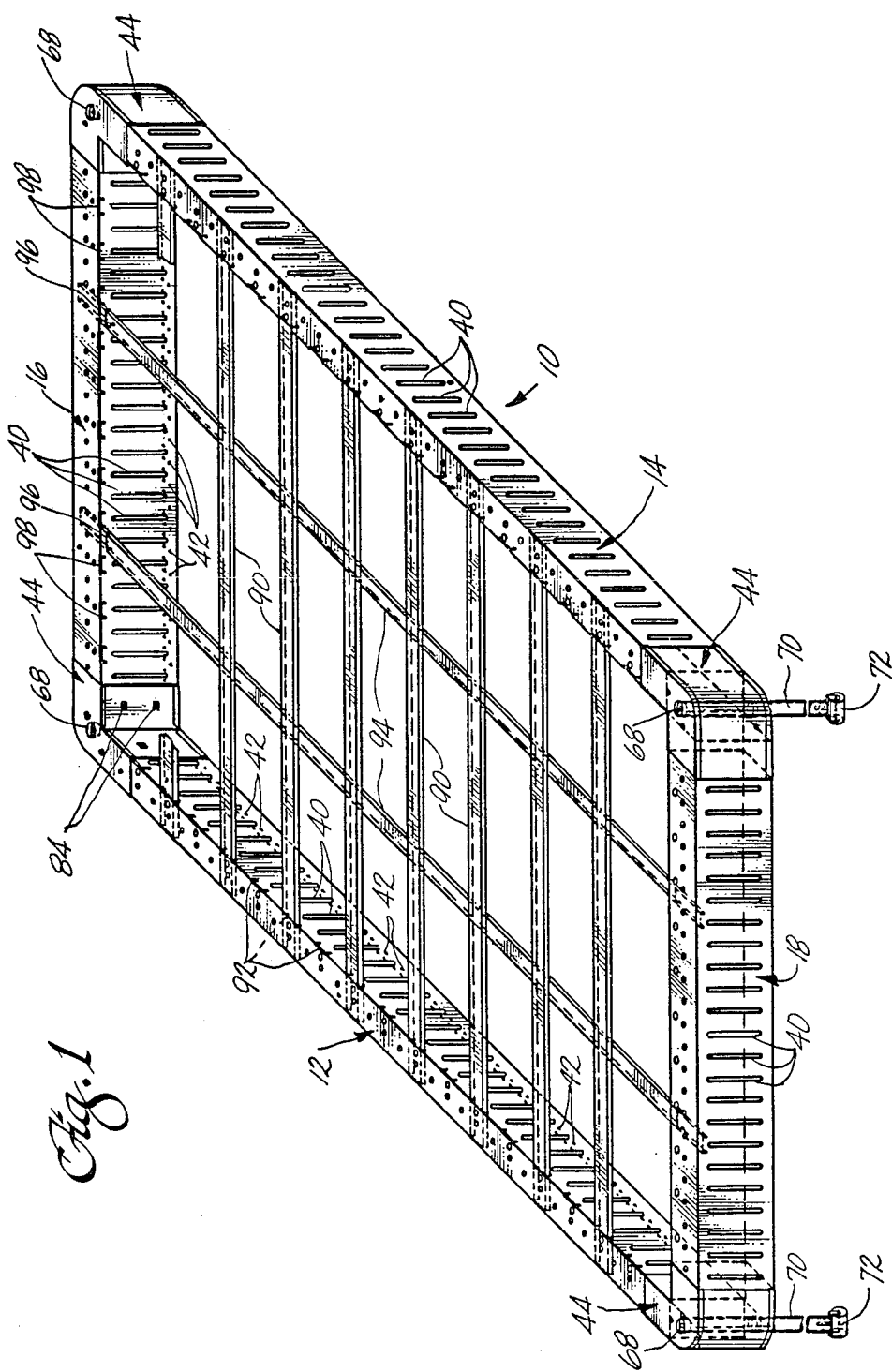

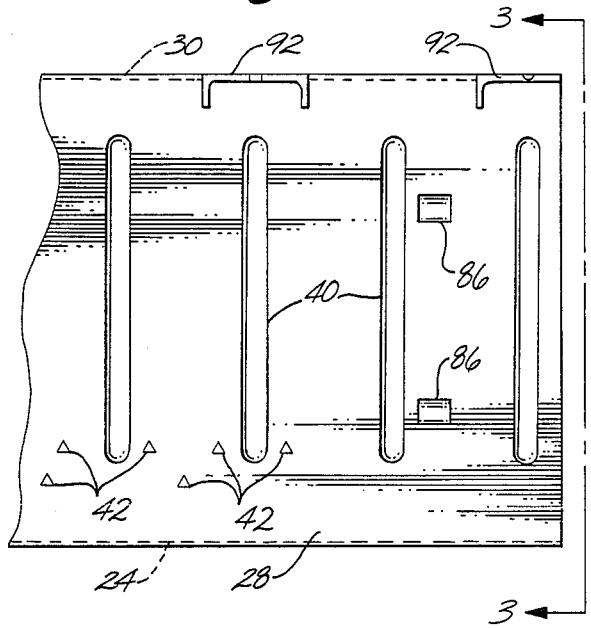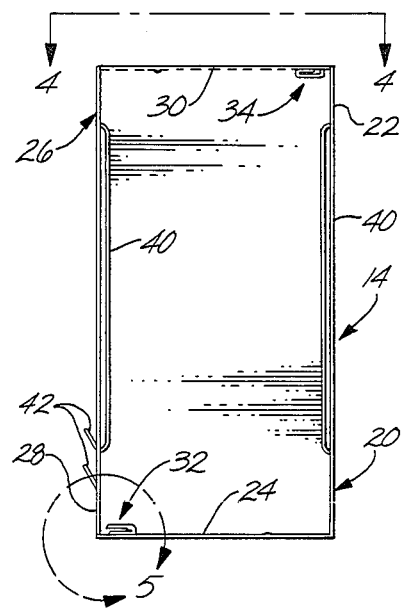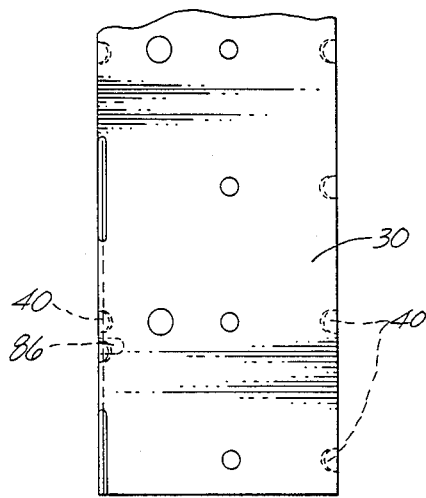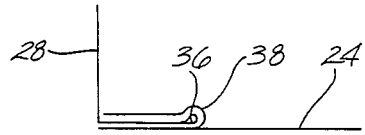

METAL FOUNDATION FOR BEDS

FIELD OF THE INVENTION

This invention relates to foundations for use with mattresses in the bedding field, and more particularly to a modular mattress-supporting foundation made of metal components easily assembled into a foundation which can replace the conventional frame and box spring assembly.

BACKGROUND OF THE INVENTION

Mattress-supporting foundations for conventional box springs are often made of wooden frame members with a cloth outer cover. The conventional box springs are large and heavy. They require a considerable storage space and, therefore, are expensive for stocking in inventory, especially in different sizes, and they have a high cost for transporting them from the factory to the customer or mattress manufacturer. Improvements are always sought in the expense of manufacturing, handling, assembling and transporting bed foundations and in the quality of the end product.

The present invention provides a metal bed foundation manufactured in modular form and capable of being transported and assembled at a reasonably low cost, while providing a high quality end product.

SUMMARY OF THE INVENTION

Briefly, one embodiment of this invention provides a metal foundation for a bed which comprises a modular system of components which are easily assembled into the finished foundation without conventional fasteners. The assembly includes a pair of parallel and elongated tubular side frame members of rectangular cross-section, each formed by two L-shaped sheet metal pieces interlocked together along the length of the rectangular frame member. Vertical stiffening ribs may be spaced apart along the inside and outside faces of the rectangular side frame members for added rigidity. A pair of parallel tubular rectangular end frame members are each formed by interlocking L-shaped sheet metal pieces which are substantially identical to the side frame members, but shorter in length. The end frame members are spaced apart longitudinally between the ends of the spaced apart and parallel side frame members. Four L-shaped and tubular corner connectors of rectangular cross-section provide sockets to slidably receive corresponding ends of the rectangular side and end frame members at each corner of the foundation. Longiudinal and lateral cross-slats of inverted U-shaped channel configuration are slidably fitted into corresponding slots formed along the inside faces of the rectangular side and end frame members, respectively. Tapered vertically extending legs are slidably extended into flanged openings at the corners of the corner connectors for holding the assembled foundation in a fixed position for support above a floor. The top and sides of the assembled foundation are covered with cloth, and hooks at the lower inside faces of the side and end frame members capture the edges of the cloth covering to form the completed foundation.

The foundation is rugged and strong and easy for a distributor to assemble into its finished form. The various unassembled parts are designed to nest together, enabling compact shipment from the factory to the distributor.

These and other aspects of the invention will be more fully understood by referring to the following detailed description and the accompanying drawings.

DRAWINGS

FIG. 1 is a perspective view illustrating one embodiment of an assembled metal bed foundation according to principles of this invention.

FIG. 2 is a fragmentary side elevation view showing one side of a side frame member of the foundation.

FIG. 3 is an end elevation view taken on line 3—3 of FIG. 2.

FIG 4 is a fragmentary top view taken on line 4—4 of FIG. 3.

FIG. 5 is a semi-schematic end view showing a means for interlocking L-shaped members of the rectangular side frame members of the foundation. The figure is not drawn to scale in order to show the separate parts with added clarity.

DETAILED DESCRIPTION

Figure 6:
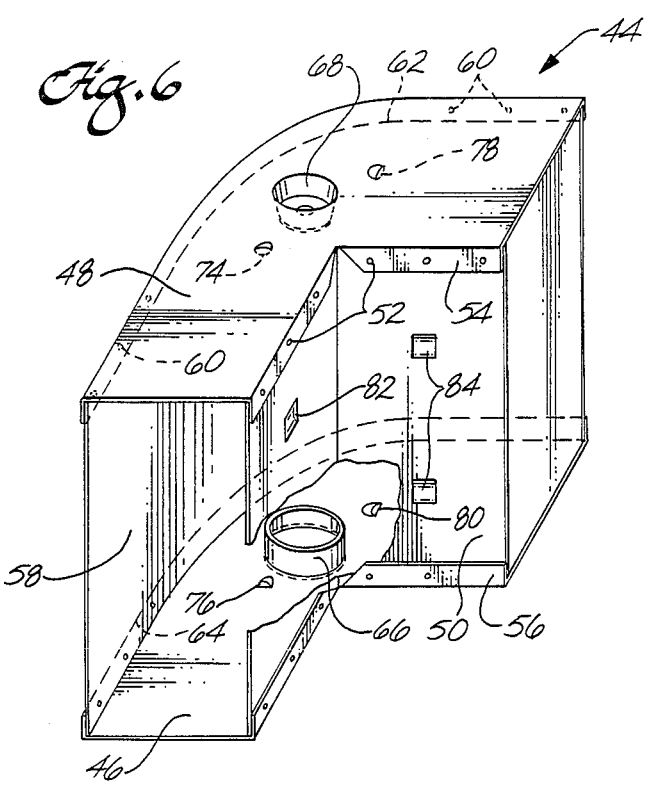
FIG. 6 is a perspective view, partly broken away, illustrating construction of an L-shaped corner connector.
Figure 7:
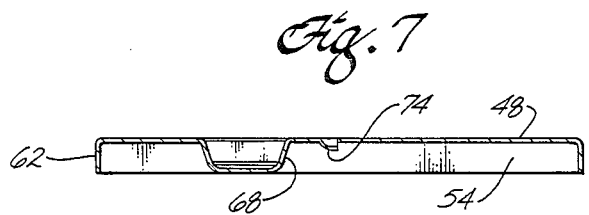
FIG. 7 is an end view of a top portion of the corner connector of FIG. 6.
Figure 8:
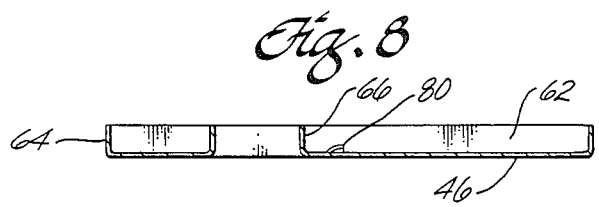
FIG. 8 is an end view of a bottom portion of the corner connector of FIG. 6.

FIG. 1 is a perspective view illustrating an assembled mattress-supporting foundation 10 for a bed according to principles of this invention. The foundation is modular, components of the foundation are made of metal, and they are assembled into the completed foundation shown in FIG. 1 without conventional fasteners such as screws, bolts, pins, rivets, or the like.

The foundation includes a pair of laterally spaced apart and parallel elongated metal side frame members 12 and 14 extending along the length of the foundation. A pair of longitudinally spaced apart and parallel elongated metal end frame members 16 and 18 extend between the ends of the side frame members at opposite ends of the foundation. The assembled side and end frame members form a rectangular outer frame of the foundation, in which the side members are of uniform length and are longer than the shorter end members which are also of uniform length.

The side frame members are each of identical construction. Each side frame member is a tubular member of rectangular cross-section from end to end, and each is assembled from a pair of elongated L-shaped sheet metal pieces. As shown best in FIG. 4, the side frame member 14 (on the right side of the foundation shown in FIG. 1) is assembled from a first L-shaped piece 20 having a side 22 forming an outer face of the rectangular side frame member 14, and a bottom flange 24 forming the bottom face of the side member 14. The rectangular side frame member also includes a second L-shaped sheet metal piece 26 having a side 28 forming an inner face of the rectangular side frame member 14, and a top flange 30 forming the top face of the rectangular side frame member. The L-shaped pieces normally can nest together in their unassembled configuration owing to their matching L-shaped configuration. They are assembled into the rectangular tubular side frame member 14 by inverting one L relative to the other L to form the box configuration. The two L-shaped pieces are then connected by slidably engaging connector tracks 32 and 34 at diagonally opposite corners of the rectangular side frame member. As shown best in FIG. 5, the lower connector track 32 includes a short locking flange 36 extending along the bottom edge of the inside face 28 of one L-shaped piece, and a mating socket 38 of matching configuration formed along the outer edge of the lower flange 24 of the other L-shaped piece. Similarly, the upper connector track 34 is formed by a short locking flange along the upper edge of the outer face of one L-shaped piece, and a mating socket extends along the outer edge of the top flange 30 of the other L-shaped piece. The pairs of connector tracks are used for assembling the L-shaped pieces into the rectangular side frame member by simply engaging the locking flanges with their corresponding sockets and sliding one L-shaped side piece lengthwise relative to the other to interlock the two side pieces in a sliding fit, lengthwise along the entire length of the assembled rectangular side frame member.

The left side frame member 12 is constructed and assembled in a manner identical to the side frame member 14 described previously.

The end members 16 and 18 are also of similar configuration in that each is assembled from a pair of L-shaped sheet metal pieces which are interlocked with similar connector tracks and slid together to form the rectangular cross-section hollow tubular frame member. Further construction details of the side members 12 and 14 are illustrated in FIGS. 1 through 4.

Vertically extending stiffening ribs 40 are integrally formed in the inside and outside faces of the side members 12 and 14 and in the inside and outside faces of the end members 16 and 18. The stiffening ribs are longitudinally spaced apart at uniform intervals and extend parallel to each other along the upright faces of each L-shaped member forms the side and end frame members. The stiffening ribs add rigidity to the side and end frame members.

Hooks 42 are formed along the lower inside faces of the side members 12 and 14 and end members 16 and 18. The hooks provide a means of attachment to a cloth cover (not shown) stretched over and around the assembled foundation.

L-shaped hollow tubular corner connectors 44 of rectangular cross section are connected to the adjoining ends of the side and end frame members at each corner of the assembled rectangular foundation. Each end connector includes has a flat L-shaped bottom face 46 with a curved outer corner and a right angle inner corner. A flat L-shaped top surface 48 is spaced above and has the same shape as the bottom face. A vertically extending right angle inside face 50 is rigidly secured by spot welding 52 to flanges 54 and 56 along the inside edges of the top surface 48 and bottom face 46. A vertically extending right angle outer face 58 is rigidly secured by spot welding 60 to flanges 62 and 64 along the outside edges of the top surface 48 and bottom face 46.

A relatively wider diameter flanged hole 66 is formed at the corner of the L-shaped bottom face 46 of the corner connector, and a relatively smaller diameter flanged hole 68 is formed at the corner of the top surface 48 of the corner connector in axial alignment directly above the bottom flanged hole 66. When the foundation is assembled, the pair of flanged holes in each corner connector receive corresponding tapered vertically extending legs 70 supported on the floor by casters 72.

In assembling the foundation, the end portions of the side frame members 12 and 14 slide into the interior of the corner connectors. Detents 74 and 76 project into the interior of the corner connector from the bottom face 46 and top face 48 of the corner connector to engage the ends of the sliding side frame members to provide stops in front of the flanged holes 66 and 68.

Similarly, detents 78 and 80 project into the interior of the corner connector from the bottom face 46 and top face 48 to engage the ends of the sliding end frame members to provide stops adjacent to the flanged holes.

Figure 9:
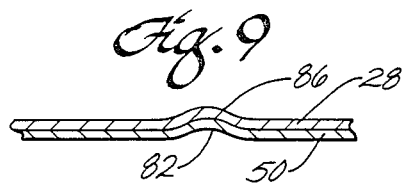
FIG. 9 is a semi-schematic illustration of a means for interconnecting side and end frame members of the foundation with the corner connectors.

The inside face 50 of each corner connector has vertically spaced apart detents 82 and 84 projecting into the interior of the corner connector for engaging corresponding detent surfaces 86 at the ends of the rectangular side and end frame members. Thus, when the side and end frame members slide into the corner connectors, the cooperating detent surfaces are engaged, as shown at FIG. 9, to interlock in a spring-like friction-fit.

The holes shown at regular intervals along the top surfaces of the side and end frame members are non-frictional and are similarly used for holding tooling pins in a machine for stamping the sheet metal pieces.

In assembling the foundation, a system of laterally and longitudinally spaced apart slats provide cross-bracing between the long side frame members 12 and 14 and the shorter end frame members 16 and 18. Referring to FIG. 1, lateral cross-bracing is formed by a plurality of sheet metal slats 90 of inverted U-shaped channel configuration. The lateral slats are identical in construction and their ends slide into corresponding inverted U-shaped slots 92 formed along the upper portion of the inside faces of the rectangular side frame members 12 and 14. The slots 92 are uniformly spaced apart along the length of each side frame member, and selected pairs of slots may be used for receiving the ends of a desired number of lateral slats, while leaving the remaining slots unused.

The foundation may be assembled in a variety of sizes and the illustrated embodiment of FIG. 1 shows a wider foundation in which a pair of longitudinal slats 94 extend along the length of the completed foundation in the space between the side frame members 12 and 14. In other foundation sizes, only one of the longitudinal slats 94 may be used in which case the end frame members 16 and 18 are shorter as are the lateral slats 90; or in a further smaller size foundation the longitudinal slats 94 may not be used with the sole means of internal support is provided by even shorter lateral slats 90. The longitudinal slats 94 are each of identical construction and each comprises an inverted U-shaped sheet metal channel. The longitudinal slats 94 extend parallel to each other at approximately uniformly spaced intervals along the width of the foundation. The ends of the longitudinal slats 94 are slidably received in inverted U-shaped slots 96 formed along an upper portion of the inside faces of the rectangular end frame members 16 and 18. The slots 96 for receiving the longitudinal slats 94 are formed at a lower level on the inside faces of the end frame members than the slots 92 of the side frame members. In addition, the end frame members also have the row of inverted U-shaped slots 98 formed at regular intervals at the same level as the slots 92 on the side frame members even though the slots 98 in the end frame members are not used. The purpose is to reduce manufacturing costs by producing identical component parts for the side frame and end frame members.

The components of the foundation are manufactured from a few identical parts. The L-shaped members of the side and end frame members nest together during shipment to the end user, normally a distributor of the foundation. At the assembly site the L-shaped members are slipped together to form the rectangular side and end frame members. The ends of the side frame members are inserted into the corner connectors, and the end frame members are also inserted into the corner connectors, while the lateral and longitudinal slats are assembled in place to provide the cross-bracing in the interior of the rectangular outer frame. The entire assembly of metal components fits together in a completed foundation without use of conventional fasteners. The castered legs are inserted into the four corners of the assembled foundation, and the cloth cover is attached to the hooks on the inside faces of the side and end frame members. The result is a rugged and strong, easily assembled foundation.

What is claimed is:

1. A metal foundation for a bed comprising a modular system of components easily assembled into a finished foundation without conventional fasteners, the assembly including:
    a pair of parallel and elongated tubular side members of rectangular cross-section each formed by a pair of nestable L-shaped sheet metal pieces interlocked together along the length of the rectangular member;
    a pair of parallel tubular rectangular end members each formed by interlocking nestable, L-shaped sheet metal pieces substantially identical in crans section to the side frame members, the end members being spaced apart longitudinally between the ends of the spaced apart and parallel side members for use in forming a rectangular outer frame;
    corner connectors at each corner of the assembled frame, each corner connector comprising a generally L-shaped and tubular connector of rectangular cross section to provide sockets to slidably receive corresponding ends of the rectangular side and end frame members at each corner of the foundation; and
    lateral cross-slats of inverted U-shaped channel configuration slidably fitted into corresponding slots formed on the inside faces of the rectangular side members, the lateral cross-slats providing interior cross-bracing along the length of the assembled rectangular outer frame of the foundation.

2. Apparatus according to claim including a series of vertically extending and longitudinally spaced apart stiffening ribs along inside and outside faces of the assembled side and end frame members for added rigidity.

3. Apparatus according to claim 1 including one or more longitudinal cross-slats of inverted U-shaped channel configuration slidably fitted into corresponding slots formed on the inside faces of the rectangular end frame members.

4. Apparatus according to claim 1 including a system of hooks spaced apart longitudinally along a lower inside face of the assembled rectangular side and end frame members to provide a means for attachment for a cloth covering for the completed foundation.

5. Apparatus according to claim 1 including flanged openings at the top and bottom of each corner connector to receive a corresponding leg at the corner of the foundation.

6. Apparatus according to claim including spring detent means cooperating between the corner connectors and the ends of the side and end frame members in a pressure fit when the ends of the side and end frame members are in an assembled position inside the corner connectors.

* * * * *

UNITED STATES PATENT AND TRADEMARK OFFICE
CERTIFICATE OF CORRECTION

PATENT NO. : 4,870,711
DATED : October 3, 1989
INVENTOR(S) : Arthur O. Felix

It is certified that error appears in the above-identified patent and that said Letters Patent is hereby corrected as shown below:

In the Specification:

Column 1, line 51, change "Longiudinal" to
-- Longitudinal --.

In the Claims

Column 5, line 34, change "crans" to -- cross --.

Column 6, line 14, after "claim" insert -- 1 --.
Column 6, line 32, after "claim" insert -- 1 --.

Signed and Sealed this

Fourteenth Day of May, 1991

Attest:

HARRY F. MANBECK, JR.

*Attesting Officer*     *Commissioner of Patents and Trademarks*